Sept. 15, 1931.     N. HUBBARD     1,823,493
BELT CONTROLLER
Original Filed Sept. 29, 1925
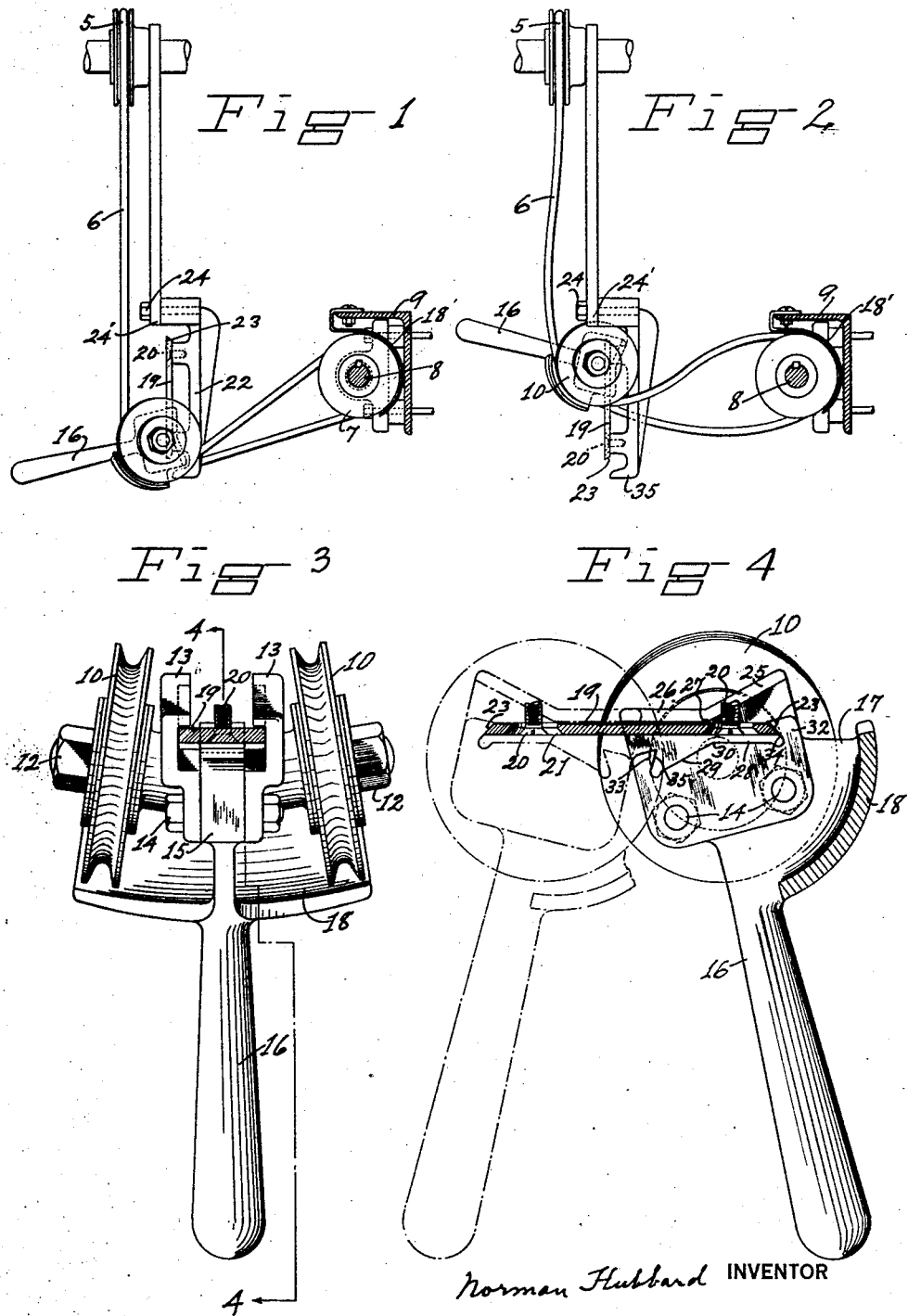

Patented Sept. 15, 1931

1,823,493

UNITED STATES PATENT OFFICE

NORMAN HUBBARD, OF ELIZABETH, NEW JERSEY

BELT CONTROLLER

Original application filed September 29, 1925, Serial No. 59,279. Divided and this application filed January 4, 1928. Serial No. 244,424.

This is a division of my application Serial No. 59,279, filed September 29, 1925. The invention relates to a device for starting or stopping a belt driven machine, wherein both driving and driven pulleys are fixed to their respective shafts, without the intervention of a loose pulley or moving the belt out of alignment with the pulleys, by the guided and limited movement outwardly or inwardly of a carriage that is provided with a handle and a pair of idlers as a means to stretch or slack the belt.

A feature of this invention is that the termination of the said outward or inward movement of the said carriage locks it in either position to maintain the machine either in motion or at rest.

The invention will be understood from the description in connection with the accompanying drawings in which Fig. 1 is a side view of the device showing the belt taut; Fig. 2 is a similar view showing the belt loose; Fig. 3 is a front view of the carriage; and Fig. 4 is a section along the line 4—4 of Fig. 3.

In the drawings reference character 5 indicates a pulley that is to be driven by means of the belt 6 from a driving pulley 7 mounted upon a driving shaft 8 that may be driven in any convenient manner. The shaft 8 may be mounted upon a support 9 and the belt 6 from the pulley 7 passes over idlers 10 on a carriage that can be shifted to tighten the belt.

The device, which is called a carriage, for convenience, includes trunnions 12 upon which the idler pulleys 10 are revolubly mounted. The trunnions 12 project outwardly from the face plates 13 that are bolted by means of the bolts 14 to the head 15. On this head 15 is an arm or handle 16 which is provided with a web 17 extending to one side thereof, and on which is mounted a guard plate 18. The edges of the two face plates 13 opposite the belts 14 are spaced apart so that the carriage can be slidably mounted upon a bar or guide 19. The guide 19 is fastened by means of screws 20 that pass through slots 21 in the guide 19 to a stationary bracket or support 22. The guide 19 is provided with beveled ends, as indicated at 23, and is adjustable longitudinally because of the slots 21. The bracket or support 22 is fixed by a bolt 24 to a fixed member.

From the inner face of each plate 13, flanges 25 and 26 project inwardly and diverge from an apex 27, so that the flange 25 is parallel to the inner face 29 and the flange 26 is parallel to the inner face 28 of the head 15. The faces 28 and 29 diverge from an apex 30. The diverging faces of the head 15 are terminated at the ends by projections or lugs 32 and 33, the adjacent faces 34 and 35 of the lugs being beveled to the same angle as the ends 23 of the guide 19, and the inner faces of the lugs being parallel and on a plane with the apex 30, all to the end that the carriage may be mounted on the guide 19 and moved in a path parallel to it, until one or the other of the lugs 32 and 33 passes one end of the guide 19 when the head 15 is rotated on the apex 30 so as to bring one of its diverging faces 28 and 29 in contact with the guide 19 and the beveled faces of lugs 32 and 33 in contact with the beveled end 23 of the guide 19.

The operation is as follows: The carriage being secured in a position nearest to the pulley 5 by the lug 33 being in contact with the beveled end 23 of the guide 19, and the belt 6 slack, it is desired to drive the pulley 5, the carriage is moved outwardly by means of the handle 16 along and parallel to the guide 19, the parallel faces of lugs 32 and 33 and the apex 30 of the body 15 being in contact with the outer face of guide 19 and the apex 27 of the face plates 13 being in contact with the inner face of the guide 19, until the lug 32 passes the lower end of the guide 19 when the body 15 rotates on the apex 30, bringing the inner face of the guide 19 in contact with the flange 26, and the beveled face 34 of the lug 32 in contact with the outer beveled end 23 of the guide 19, thus tightening the belt 6 by means of the idlers 10, and revolving the pulley 5.

When it is desired to stop driving the pulley 5, the carriage is moved inwardly by means of the arm 16 in a manner inversely of that described for tightening the belt to drive the pulley.

The carriage is confined in its movement along the guide 19 and prevented from being detached therefrom by coming in contact with the member 24' when the carriage is in its innermost position and with a projecting heel 35 at the lower end of the bracket for support 22 when the carriage is in its outermost position.

The guard 18 retains the belt 6 on the idlers 10 when it is slack, and the guard 18' retains the belt on the pulley 7 at the same time.

I claim:

1. A belt controller comprising movably mounted idlers and lug engaging means, a fixed support, means on said support comprising a beveled lug to retain said controller at either end of said fixed support.

2. A belt controller comprising movably mounted idlers, a fixed support, said controller being slidable on said support and means to retain said controller at either end of said fixed support, said means including a flange and lugs.

3. A belt controller comprising movably mounted idlers, a fixed support, said controller being slidable on said support and means to retain said controller at either end of said fixed support, said means including a flange and lugs in alignment with said flange.

4. In combination, a slide, a carriage movable along said slide and provided with an idler, and means for hooking said carriage over the respective ends of said slide.

5. In combination a fixed guide, a carriage slidably mounted thereon and means comprising a beveled lug to retain said carriage at either end of said guide to render a belt operative or non-operative.

6. In combination a slide, an idler carriage movable along said slide, and latching means operated by tension of a belt for retaining said carriage in position on said slide to render the belt operative.

7. In combination a slide, an idler carriage and latching means operated by tension of a belt for retaining said carriage in position to render the belt operative, said carriage being releasable by turning the same.

NORMAN HUBBARD.